March 24, 1959  F. A. KROHM  2,878,506
DRIVE SHAFT MECHANISM FOR WINDSHIELD WIPER ARMS
Filed June 26, 1953  2 Sheets-Sheet 1

INVENTOR.
FRED A. KROHM
BY
Charles S. Penfold
ATTORNEY

March 24, 1959  F. A. KROHM  2,878,506
DRIVE SHAFT MECHANISM FOR WINDSHIELD WIPER ARMS
Filed June 26, 1953  2 Sheets-Sheet 2

INVENTOR.
FRED A. KROHM
BY
Charles S. Penfold
ATTORNEY

United States Patent Office 2,878,506
Patented Mar. 24, 1959

2,878,506

DRIVE SHAFT MECHANISM FOR WINDSHIELD WIPER ARMS

Fred A. Krohm, Hobart, Ind., assignor to The Anderson Company, a corporation of Indiana Application June 26, 1953, Serial No. 364,250

10 Claims. (Cl. 15—253)

This invention relates generally to windshield wiper apparatus and more particularly is directed to a drive shaft mechanism for actuating a wiper arm and blade attached thereto.

The drive shaft mechanism embodying the improved principles of design and construction of the invention is primarily adapted for use with curved windshields.

The adoption of curved windshields by the automotive and aircraft industries has presented problems with respect to wiping curved surfaces not encountered in wiping flat or planar surfaces.

At the present time substantially the same drive mechanism for transmitting motion to the wiper arms and blades carried thereby is used in connection with wiping both flat and curved windshields.

The greatest number of conventional drive mechanisms now in use include a drive shaft which extends outwardly through the cowl or other part of a vehicle adjacent a windshield or window. This shaft is mounted in a suitable bearing and fixed only for oscillation therein. The inner end of a spring pressed wiper arm is secured to the shaft and its free end carries a wiper blade.

When a flat windshield is being cleaned the wiper arm moves in a plane substantially parallel to the surface being cleaned. However, when a curved windshield is being wiped by a blade moving back and forth across the windshield the arm will move inwardly and outwardly with respect to the windshield as the blade conforms to the contour thereof. During such conformation, the blade will take various angular positions with respect to the curvature of the glass, one of such positions being exemplified by a blade shown in dotted lines in Figure 5 of the drawing. When a blade takes the angular position illustrated or in any other similar angular position, it will not function as intended, because no provision is made for continuously holding the blade in an erect position or substantially perpendicular to the curvature of the glass so as to permit proper tilting or flopping of the blade and/or the wiping element thereof.

The use of a conventional drive mechanism not only has the serious disadvantages of causing the blade to wipe inefficiently as evidenced by the dotted lines in Figure 5, but occasionally causes metal parts of the blade and/or end of the wiper arm to scratch the glass.

Also, a blade driven by such a mechanism is soon rendered unfit for satisfactory use, because the resilient wiping element while being continuously subjected to abnormal stresses is excessively distorted and wears unevenly.

Attention is further directed to the fact that the use of conventional drive mechanisms for driving a wiper arm and blade across a curved windshield subjects the drive mechanism and wiper arm to considerable torsional strains and wear and as a result the drive mechanism and the wiper arm after a short period of use do not operate efficiently.

With the foregoing in mind, the primary object of the invention is to provide a drive mechanism embodying improved principles of design and construction which overcome the various disadvantages above referred to.

Broadly, an important object of the invention is to provide a drive mechanism which includes supporting means and a shaft operatively connected thereto for movement about two different axes. More specifically, the drive mechanism comprises a support, a shaft pivotally mounted on the support, and means for controlling such pivotal movement when the shaft is rotated.

The supporting means for the drive mechanism is preferably comprised of a pair of housing members detachably secured together in interlocking relationship so that one member primarily supports the shaft for movement with respect to either of the axes just referred to. One of the housing members is preferably provided with guide means having a rack and the shaft is provided with a pinion or gear sector disposed in the guide and cooperable with the rack in a manner whereby the shaft may move within a predetermined plane or in a path determined by the shape of the rack. More specifically in this respect, the arrangement is such that the shaft may rotate on its own longitudinal axis while it moves in the path defined by the guide. Actuating means, such as a crank, is preferably connected to the rear end of the shaft for operating the shaft in the manner just referred to.

Many other objects and advantages of the invention will be understood after the description hereinafter set forth is considered in conjunction with the drawing annexed hereto.

Figure 1:
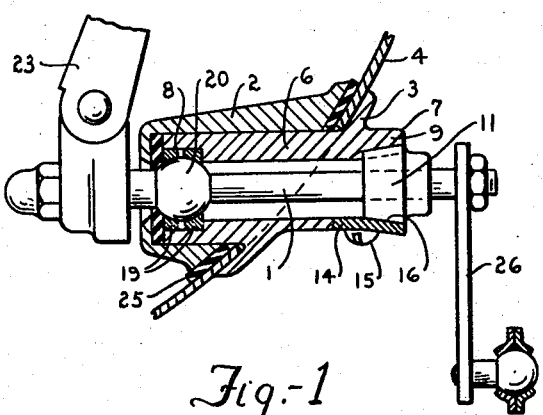
Figure 1 is a longitudinal section taken through the drive mechanism constituting the subject invention and illustrates a wiper arm connected to the outer end of the drive shaft and a crank to its inner end.
Figure 2:
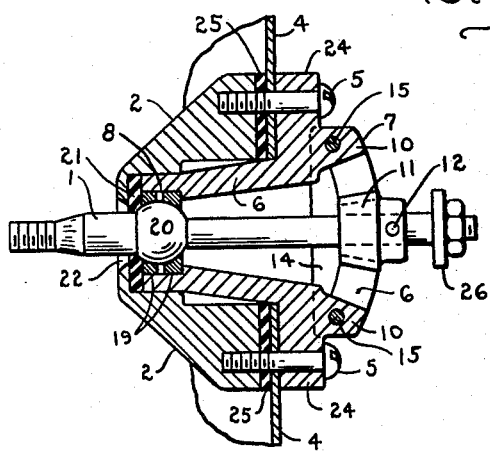
Figure 2 is a horizontal section taken through the drive mechanism.
Figure 3:
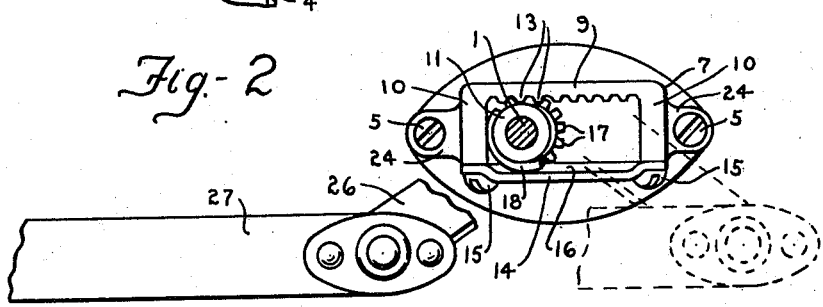
Figure 3 is a rear elevational view of the drive mechanism showing details with respect to the rack and gear sector.
Figure 4:
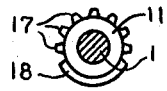
Figure 4 is an end view of the sector that is carried by the drive shaft.

The means for supporting the wiper shaft embodying the subject invention may be designed and constructed in various ways and it may also be installed or connected with respect to any form of mounting, but as illustrated in Figures 1 through 3 the supporting means for the shaft 1 preferably includes an outer housing or shell 2 and an inner housing or support 3 which are interlocked with one another and clamped to a mounting 4 by means of a pair of screws 5.

The inner housing or support 3 which primarily carries the load of the shaft comprises a tubular portion 6, a formation 7 adjacent the rear side of the housing and a recess 8 at its front side. The formation 7 includes a curved rack portion 9 and a pair of corresponding end portions 10. A pinion or sector gear 11 is fixed on the shaft by a pin 12. The rack portion 9 is also inclined and provided with teeth 13 radially arranged with respect to the longitudinal axis of the shaft. A plate 14 is detachably secured by screws 15 to the end portions 10 of the formation 7 and is formed to provide a track or bearing portion 16 which is disposed in parallel relationship to the rack and is inclined substantially the same extent that the rack is inclined. With this setup a guideway is arranged substantially transverse to the longitudinal axis of the housing for predetermining or controlling the movement of the pinion or sector gear 11.

As clearly shown the gear 11 is provided with teeth 17 which interengage or mate with the teeth on the rack. The gear is further provided with an arcuate bearing portion 18 which is adapted to slide on the bearing or track 16 provided on the plate 14.

The recess 8 adjacent the front side of the housing 3 provides a seat for a pair of bronze oil-less bearings 19 which partially embrace and support a sperical or ball shaped portion 20 provided on the drive shaft. Any form or type of bearing means may be utilized.

The outer housing 2 serves as a cover and is formed to telescopically receive the outer part of the housing 3. A gasket 21 which is seated in the housing 2 engages the end of the housing 3 including the shaft 1 and one of the bronze bearings to assist in preventing entry of foreign matter into the assembly. The outer housing 2 is provided with an opening 22 of a sufficient size to afford clearance for the operation of the shaft. The fore end of the shaft is provided with suitable means to enable a windshield wiper arm 23 to be detachably connected thereto. The housing 3 is further provided with ear-like lugs 24 through which the screws 5 extend and threadedly connect with the outer housing to hold the parts assembled. A gasket 25 is preferably interposed between the outer housing and the outer surface of the mounting 4.

Any suitable means may be employed for actuating the drive shaft but as herein illustrated a crank arm 26 is detachably connected to the rear end of the drive shaft and a link 27 connected to a power unit has one end pivotally connected to the free end of the crank for transmitting motion to the drive shaft 1.

In view of the foregoing it will be mainfest that operation of the link 27 by any suitable power unit such as an electric or vacuum operated motor will actuate the crank 26 and cause the teeth 17 and arcuate portion 18 on the gear 11 to respectively simultaneously cooperate with the teeth 13 on the rack and the bearing portion 16 of the plate 14. While the pinion is traveling or oscillating back and forth in the guideway formed by the rack and the plate the shaft 1 pivots about the axis of the ball shaped portion 20. More particularly, the shaft pivots about the axis of the ball shaped portion 20 during translatory movement of the gear in the guideway and the shaft during such translatory movement rotates about its longitudinal axis. The shaft is thus mounted for movement with respect to two different axes.

Although the drawings exemplify a guideway for causing the gear and shaft to travel a straight path or single plane it is to be distinctly understood that if found desirable the rack 9 and the plate 14 may be undulated so as to cause the gear and shaft to travel in a curved or irregular path. In other words, the design and construction of the guideway may be varied to control a wiper arm so that the blade will wipe windshields of variable contours.

Also, it is to be understood that insofar as the subject invention is concerned means other than a rack and pinion may be employed for controlling movement of the shaft. More specifically in this respect, a cam or eccentric may be substituted for a pinion with suitable means for guiding the cam or eccentric.

Figure 5:
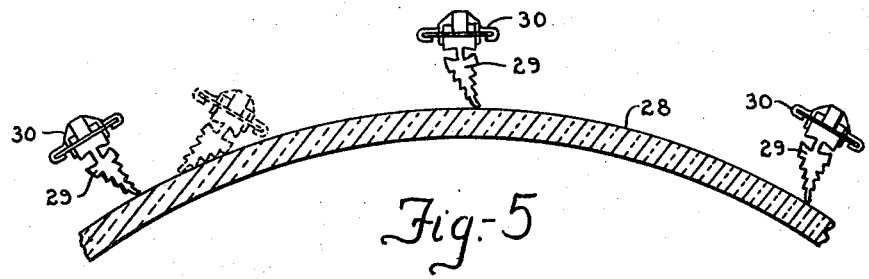
Figure 5 is a transverse section taken through a windshield exemplifying in dotted lines one of the positions that a wiper blade will take when a conventional drive mechanism is used and including the position that the same blade will take when the drive mechanism embodying the subject invention is utilized.
Figure 6:
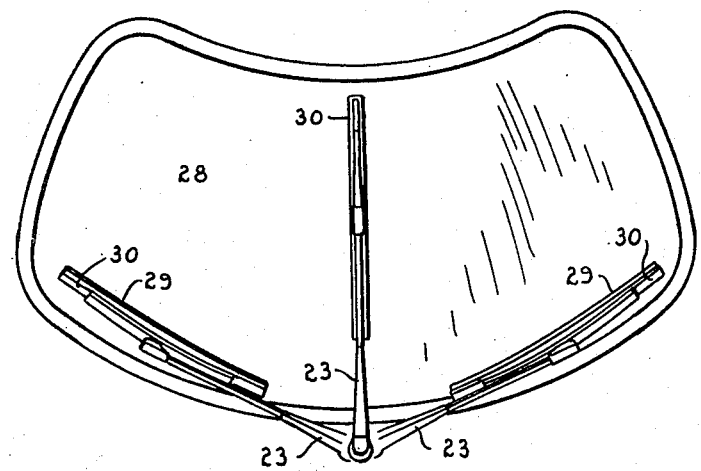
Figure 6 is a front view of a windshield showing various operative positions of the wiper arm that is actuated by the drive mechanism embodying the invention.
Figure 7:
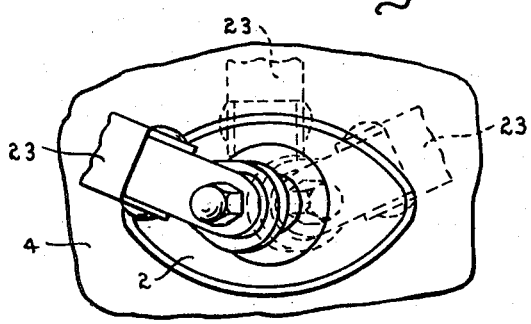
Figure 7 is a partial enlarged view of the wiper arm depicted in Figure 6 showing more clearly the different positions that the arm takes when actuated by the drive mechanism.

Referring to Figures 5, 6 and 7 of the drawing, the drive mechanism is shown as being mounted on the cowl portion of a vehicle below and substantially midway between the extremities of a windshield 28. The location of the drive mechanism is primarily dependent on the shape or character of the windshield to be cleaned. The arrangement depicted is merely illustrative and serves to obtain a balanced operating condition. More particularly, the drive mechanism is more or less located adjacent the apex or crest of the curve in the windshield.

As illustrated in Figures 5 and 6 the free end of the wiper arm 23 is provided with a wiper blade. The wiper blade may be designed and constructed as desired but as herein shown includes a resilient wiping element 29 and a uniformly freely flexible backing or support 30 for the wiping element so that the blade will follow the contour or curvature of the glass.

As alluded to above, the use of a conventional drive mechanism will cause a wiper blade to more or less take the inclined abnormal wiping position illustrated by the dotted lines in Figure 5. However, when the drive mechanism embodying the subject invention is employed the wiper blade is maintained erect in all of its wiping positions as illustrated by the full lines in Figures 5 and 6. More particularly in this regard, when the drive mechanism is operated to cause the gear 11 to travel to the right to the limit of its travel as illustrated in Figure 3 the wiper arm and blade will take the left hand position as illustrated in Figures 5 and 6 of the drawing and when the gear is moved to the left as shown by the full lines in Figure 3 the wiper arm and blade will take the right hand position illustrated in Figures 5 and 6.

With this novel arrangement the shaft is controlled to properly located the arm and maintain the blade in a proper wiping position at all times as illustrated in Figure 5 as it is moved back and forth across a windshield.

Having thus described my invention, it is obvious that various other modifications may be made in the same without departing from the spirit of my invention; hence I do not wish to be understood as limiting myself to the exact form, construction, arrangement and combination of parts herein shown and described or uses mentioned.

I claim:

1. A drive mechanism comprising an elongated hollow support, a shaft pivotally connected in one end of the support, a guideway spaced from said point of connection and arranged transverse to the longitudinal axis of the shaft, said guideway being provided with teeth, and means carried by the shaft movable in the guideway and engaging the teeth for bodily pivoting the shaft back and forth in the guideway when oscillated about its axis.

2. A drive mechanism comprising an elongated housing provided with a rack and a bearing spaced from the rack, a shaft extending lengthwise in the housing, said shaft being provided with an enlargement engaging the bearing and a gear fixed on the shaft engaging the rack, one extremity of the shaft providing a support for a member to be driven, and means at its other extremity for oscillating the shaft and the gear so that the gear will travel along the rack to bodily move the shaft transverse to the longitudinal axis of the housing so that the enlargement will pivot on the bearing.

3. Apparatus of the kind described comprising a curved windshield, a housing mounted adjacent the windshield, a one-piece drive shaft carried by the housing and extending outwardly adjacent one side of the windshield, a wiper arm mounted on the outer end of the drive shaft and a wiper blade carried by the arm, the inner end of the shaft being provided with means for connection with a driving mechanism, a bearing provided on the housing and guide means spaced from the bearing, said shaft having a portion rockably mounted on the bearing and another portion movable on the guide means in substantially a plane containing said shaft axis to rock the arm and thereby maintain the wiper blade in a substantially erect position with respect to all portions of the windshield to be wiped when actuated by the driving mechanism.

4. Apparatus of the kind described comprising a curved windshield, an elongated housing mounted adjacent the windshield, a drive shaft carried by the housing and extending outwardly adjacent one side of the windshield, a wiper arm mounted on the outer end of the drive shaft and a wiper blade carried by the arm, the inner end of the shaft being provided with means for connection with a driving mechanism to oscillate the shaft about its longitudinal axis, a bearing provided on the housing and a rack spaced from the bearing and disposed transverse to the longitudinal axis of the housing, said shaft having a portion engaging the bearing and a pinion cooperating with the rack in a manner to bodily move the shaft and arm to maintain the wiper blade in a substantially erect position with respect to all portions of the windshield to be wiped when actuated by the driving mechanism.

5. A drive mechanism comprising: a guide and a bearing spaced from the guide, a shaft supported for movement on the bearing, said guide being oblong and disposed transverse to the longitudinal axis of the shaft and provided with cooperating means, and means carried by a portion of the shaft arranged for movement in the guide and engaging the cooperating means in a manner to alternately move the shaft portion and said means thereon toward the ends of the guide when the shaft is oscillated about its axis.

6. A drive mechanism comprising: supporting means having a guideway and a bearing axially spaced from the guideway, a shaft having an outer portion engaging the bearing, said guideway being oblong and arranged substantially transverse to the longitudinal axis of the shaft, and means fixed on the inner portion of the shaft disposed in the guideway and cooperating therewith in a manner whereby the shaft will oscillate about its axis when its inner portion and means thereon are alternately moved toward the ends of the guideway transverse to the longitudinal axis of the shaft.

7. A drive mechanism comprising tubular supporting means having an elongated guide arranged transverse to the longitudinal axis of the supporting means and a bearing spaced from the guide, cooperating means in the guide, a shaft extending through the supporting means and having a portion mounted for movement in the bearing, and means carried by a portion of the shaft arranged for movement in the guide and engaging the cooperating means in a manner to alternately move the shaft portion and means thereon toward the ends of the guide when the shaft is oscillated.

8. A drive mechanism comprising elongated supporting means having an oblong guideway provided adjacent one extremity of the supporting means and arranged substantially transverse to its longitudinal axis, said supporting means being provided with a bearing adjacent its other extremity, a shaft having an outer portion engaging the bearing on the supporting means, and means fixed on an inner portion of the shaft disposed in the guideway and cooperating therewith in a manner whereby the shaft will oscillate about its axis when its inner portion and means thereon is alternately moved toward the ends of the guideway transverse to the longitudinal axis of the support.

9. Apparatus of the kind described comprising a curved windshield, a housing mounted adjacent the windshield, said housing having a bearing and an oblong guide provided with cooperating means, a drive shaft having an outer end projecting from the housing and outwardly adjacent one side of the windshield, a wiper arm mounted on the outer end of the drive shaft and a wiper blade carried by the arm, the inner end of the shaft being provided with means for connection with a driving mechanism for oscillating the shaft about its longitudinal axis, and said shaft having an intermediate portion pivotally mounted on the bearing and a part disposed in the guide and engaging said cooperating means, the arrangement being such that when the shaft is oscillated about its longitudinal axis it will pivot on the bearing and cause said part to alternately move toward the ends of the guide transverse to the longitudinal axis of the support in a manner to maintain the wiper blade in a substantially erect position with respect to all portions of the windshield to be wiped.

10. Apparatus of the kind described comprising a curved windshield, tubular means mounted adjacent the windshield, a member mounted for oscillation and pivotal movement about different axes with respect to said tubular means and having a portion extending substantially axially outward from said tubular means, a spring-pressed wiper arm connected to the extending portion of said member and provided with a resiliently flexible wiper blade for engaging the windshield, a toothed gear carried by said member, toothed gear means having at least a portion disposed in said tubular means and engaging said gear in a manner whereby when the member is oscillated, the member, wiper arm and blade will be oscillated and pivoted in unison to maintain the blade in a correct wiping position during its travel on the windshield.

References Cited in the file of this patent

UNITED STATES PATENTS

| | | |
|---|---|---|
| 762,159 | Fillman | June 7, 1904 |
| 1,407,672 | Robinson | Feb. 21, 1922 |
| 1,747,284 | Berill | Feb. 18, 1930 |
| 2,356,424 | Paton | Aug. 22, 1944 |
| 2,412,319 | Carey | Dec. 10, 1946 |
| 2,624,904 | Wianco | Jan. 13, 1953 |
| 2,691,186 | Oishei | Oct. 12, 1954 |